Oct. 15, 1963  D. R. DURHAM  3,107,283
ELECTRIC POWER DISTRIBUTION APPARATUS
Filed Nov. 1, 1960

3,107,283
ELECTRIC POWER DISTRIBUTION APPARATUS
Daniel R. Durham, Beaver Falls, Pa., assignor to Westinghouse Electric Corporation, East Pittsburgh, Pa., a corporation of Pennsylvania
Filed Nov. 1, 1960, Ser. No. 66,627
7 Claims. (Cl. 200—114)

This invention relates to electric power distribution apparatus and more particularly to bus plug-in units that can be removably mounted on bus duct to tap power off of the bus duct.

In order to protect workmen from accidental electrical shock, it is important in certain types of bus duct systems to provide plug-in units having means for preventing access to the interior of the units under certain conditions.

Accordingly, an object of this invention is to provide a bus duct plug-in unit comprising a housing having an openable cover and improved interlocking means for preventing opening of the cover.

Another object of the invention is to provide an improved bus duct plug-in unit comprising a housing having an openable cover thereon, interlocking means for preventing opening of the cover, interlock defeating means that can be operated to defeat the interlocking means to thereby permit opening of the cover and means automatically operated to prevent defeat of the interlocking means when the plug-in unit is mounted on a section of bus duct with the cover in the closed position.

Other objects of the invention will be explained fully hereinafter or will be apparent to those skilled in the art.

In accordance with one embodiment of the invention, a bus duct plug-in unit is provided comprising a housing having circuit interrupting means mounted therein and an openable cover mounted thereon. An interlocking latch is rotatably mounted on one side wall within the housing. The interlocking latch has a hooked latch portion at its upper end extending out through an opening in the cover to latch the cover in closed position. The other or lower end of the interlocking latch is disposed just over an opening in the base of the housing. A torsion spring is provided biasing the interlocking latch to the closed or latching position. When the plug-in is not mounted on a section of bus duct, the latch end of the interlocking latch can be manually rotated, against the bias of the torsion spring, out of latching position to permit opening of the cover. During this movement, the lower end of the interlocking latch moves out through the opening in the base of the housing. When the cover is opened and the latch portion is released, the torsion spring moves the latch back to its normal position. When the plug-in unit is mounted on a section of bus duct, the lower end of the interlocking latch will engage the bus duct housing to prevent rotational or unlatching movement of the interlocking latch. Thus, the interlocking latch operates automatically to prevent opening of the cover when the plug-in unit is mounted on a section of bus duct with the cover in the closed position.

For a better understanding of the nature and objects of the invention, reference may be had to the following detailed description, taken in conjunction with the accompanying drawings, in which.

Figure 1:
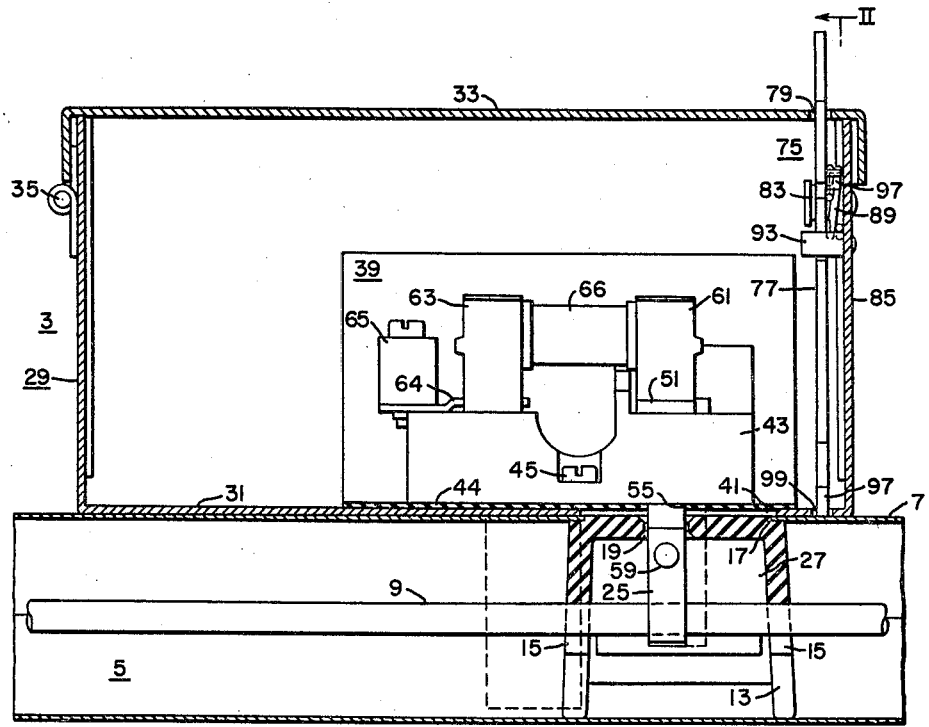
FIGURE 1 is a view, partly in section and partly in elevation, a part of a bus duct system of electrical power distribution embodying the invention.

Referring to the drawings, a bus duct plug-in unit 3 is shown mounted on a section of bus duct 5. The bus duct 5 comprises a metallic housing 7 having arranged therein, in a generally parallel relationship, three phase carrying bus bars 9 and a neutral bus bar 11. The bus bars 9, 11 are supported within the housing by means of a plurality of insulating plug-in support members 13 (only one being shown) staggered lengthwise on opposite sides of the bus bars in a manner well known in the art. The bus bars 9, 11 are positioned within grooves 15 at the inner side of the support member 13. The bus bar support 13 is mounted adjacent an opening 17 (FIG. 1) in the housing 7, and it has a plurality of openings 19 therein for receiving a plurality of clip-on type electrical connectors 25 that engage the bus bars 9, 11 when the plug-in unit 3 is mounted on the bus duct 5. Adjacent conducting members in the support member 13 are insulated from each other by means of insulating barriers 27 that are molded integral with the support member 13.

The plug-in unit 3 comprises a housing 29 having an openable cover 33 that is pivotally supported on one side wall of the housing by means of two hinges 35 (only one being shown in FIG. 1). A circuit interrupting unit indicated generally at 39 is mounted just over an opening 41 (FIG. 1) in the base 31 of the plug-in unit housing 29.

The circuit interrupting unit 39 comprises an insulating mounting block 43 supported on a generally U-shaped insulating member 44. The mounting block 43 and insulating member 44 are attached to the base 31 of the plug-in unit housing 29 by means of two bolts 45. Four angular-shaped members of conducting material 49 (FIG. 2) are supported on the insulating block 43. Each of the members 49 has an upper bent-over part 51 that rests on top of the insulating block 43 and a lower part 53 that passes through a suitable opening in the block 43 extending out of the housing 29 through an opening 55 (FIG. 1) in the insulating member 44 and through the opening 41 in the plug-in unit housing 29. One of the spring clip structures 25 is supported on the lower end of each of the conducting members 49 by means of a rivet 59.

Figure 2:
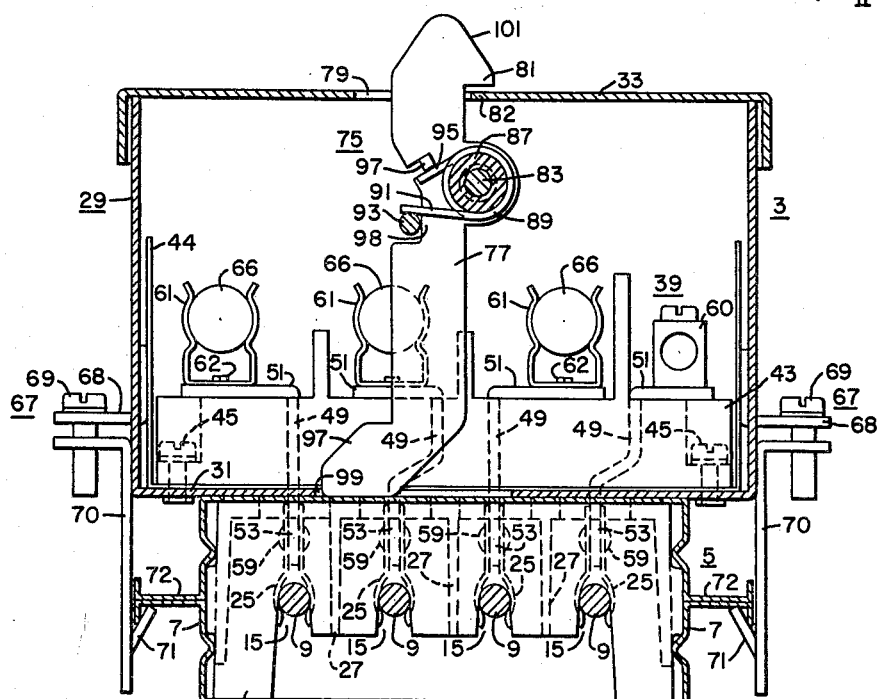
FIG. 2 is a view taken along line II—II of FIG. 1.

As illustrated in FIG. 2, a solderless terminal member 60 is positioned on top of the bent-over portion 51 of one of the outer conducting members 49. The terminal member 60 and the outer conducting member 49 are secured to the insulating block 43 by means of a bolt (not shown) that passes through openings in the members 60, 49 and 43 and has a nut (not shown) threaded on its free end which nut is positioned in a recess in the lower side of the insulating block 43.

A generally U-shaped fuse clip 61 is positioned on top of the bent-over part 51 of each of the other three conducting members 49. The fuse clips 61 and their associated conducting members 49 are secured to the insulating block by means of bolts 62 each of which has a nut (not shown) threaded on its lower end which nut is positioned in a recess in the lower side of the insulating block 43.

Another generally U-shaped fuse clip 63 (FIG. 1) is suitably secured to the mounting block 43 opposite each of the fuse clips 61. A conducting strap 64 is secured at one end to each of the fuse clips 63. A solderless terminal member 65 is secured to the other end of each of the conducting straps 64. A fuse 66 is supported in each pair of fuse clips 61, 63.

The plug-in unit 3 is supported on the bus duct 5 by means of two supporting structures 67 (FIG. 2). Each of the supporting structures 67 includes an angle bracket 68 having one leg biasing against the inside of a wall of the housing 29 and another leg that passes through a suitable opening in the side of the plug-in unit housing 29. A bolt 69 passes through a suitable opening in each of the brackets 68 and threads into a tapped opening in a bent-over part of a bracket 70 each of which brackets 70 has a stamped out projection 71 that is hooked under a flange 72 of the bus duct housing 7. The bolts 69 are tightened to draw the brackets 68, 70 together to thereby draw the plug-in unit 3 against the bus duct 5.

When the plug-in unit 3 is mounted on the bus duct, electrical power is drawn off of the three bus bars 9 through the clip structures 25, the conducting members 49, the fuse clips 61, the fuses 66, the fuse clips 63, the conducting straps 64 to the terminals 65. The neutral bus bar 11 is electrically connected to the neutral solderless terminal 60 by means of one of the clip structures 25 and one of the conducting members 49 (FIG. 2). In operation, conducting lines are connected to the terminals 65, 60 which lines pass out through suitable openings (not shown) in the housing 29 to carry power to a load. Upon the occurrence of an overload current above a predetermined value in any of the phases, the fuse 66 for the overloaded phase will interrupt the current in that phase in a manner well known in the art.

Improved interlocking means, indicated generally at 75, is provided for latching the cover 33 of the plug-in unit housing 29 in the closed position shown in the drawings. The interlocking means 75 comprises a latch 77, the upper end of which extends through an opening 79 in the housing cover 33 which upper end includes a latch portion 81 (FIG. 2) that engages a part 82 of the cover 33 to prevent opening of the cover. The latch 77 is rotatably mounted on a pin 83 that is rigidly secured to a side wall 85 of the housing 29. As best seen in FIG. 2, a washer 87 is disposed over the pin 83 and is positioned between the latch 77 and the housing side wall 85. A torsion spring 89 is wrapped around the pin 83. One end 91 of the spring 89 engages a fixed pin 93 that is secured to the side wall 85, and the other end 95 engages a bent-over projection 97 which is a part of the latch 77. The torsion spring 89 biases the latch 77 clockwise as seen in FIG. 2 to the latching position shown, in which position the hook portion 81 will engage the cover 33 to prevent opening movement of the cover.

When the plug-in unit 3 is not mounted on the bus duct 5, an operator can open the cover 33 of the housing 29 by moving the latch 77 counterclockwise (FIG. 2) to a position where the latch portion 81 is in line with the opening 79 in the cover 33, whereupon the cover 33 can be pivoted about the hinges 35 (FIG. 1) to the open position. During the counterclockwise rotational movement of the latch 77, a lower portion 97 of the latch 77 moves out through an opening 99 in the base 31 of the housing 29.

When the cover 33 is open and the operator releases the latch portion 81, the spring 89 moves the latch 77 clockwise back to the position in which it is shown in FIGS. 1 and 2. This clockwise movement is stopped when a part 98 (FIG. 2) of the latch 77 engages the stationary pin 93. When it is desired to then close the cover 33, the cover is merely pivoted back to the closed position. During the cover closing operation, the part 82 of the cover 33 engages a cam surface 101 (FIG. 2) on the latch 77, to cause the latch to rotate counterclockwise into alignment with the cover opening 79 to permit the cover to move past the latch portion 81. The lower portion 97 of the latch 77 moves out through the opening 99 in the base 31 of the housing 29 during this counterclockwise rotation of the latch 77. When the cover reaches the closed position, the spring 89 returns the latch 77 to the latched position shown.

The cover 33 cannot be opened when the plug-in unit 3 is mounted on the bus duct 5 with the cover in the closed position. When the plug-in unit 3 is mounted in position, the end 97 of the latch 77 will engage the housing 7 of the bus duct 5 to prevent counterclockwise or unlatching movement of the latch 77.

Thus, a worker will not have access to any live parts within the plug-in unit 3 because the plug-in unit must first be removed from the bus duct 5 before the latch 77 can be moved to its unlatching position. When the plug-in unit 3 is removed from the bus duct 5, disconnecting the electrical clip structures 25 from the bus bars 9, 11, the cover 33 can be opened in the same manner hereinbefore described.

If the plug-in unit 3 is mounted on the bus duct 5 with the cover in the open position, the cover cannot be closed because the lower end 97 of the latch 77 will engage the bus duct housing 7 to prevent the latch 77 from being cammed out of the way by the cover 33. The part 82 of the cover 33 will engage the cam surface 101 of the latch 77 and, since the latch 77 cannot be cammed out of the way under these conditions, the cover cannot be moved to the closed position. Therefore, the cover 33 should be closed prior to installing the plug-in unit on the duct housing, thereby protecting the worker against accidental contact with live parts during the installation of the plug-in unit.

From the foregoing description, it is apparent that the invention provides an improved bus duct plug-in unit having interlocking means for latching the cover of the unit in the closed position and means for defeating the interlocking means to permit opening of the cover. When the bus duct plug-in unit is mounted on a section of bus duct with the plug-in unit cover in the closed position, the interlocking means is automatically locked in the latching position so that the cover cannot be opened, thereby preventing access to the live parts that are disposed within the plug-in unit housing and that are electrically connected to the bus bars that are supported within the bus duct housing. When the plug-in unit is removed from the bus duct, the interlocking means can be defeated to permit opening of the cover to gain access to the interior of the unit. A worker can then safely reach into the removed plug-in unit because, upon removal from the bus duct, the plug-in unit is automatically disconnected from the energized bus bars.

The interlocking latch is of simple construction and is easily mounted within any of the standard plug-in unit housings that are presently on the market.

Since numerous changes may be made in the above described construction and different embodiments of the invention may be made without departing from the spirit and scope thereof, it is intended that all matter contained in the foregoing description or shown in the accompanying drawings shall be interpreted as illustrative and not in a limiting sense.

I claim as my invention:

1. A bus duct plug-in unit comprising, in combination, a housing having an opening in the base thereof, an openable cover on the housing and having an opening therein, a latch structure rotatably supported in said housing in proximity to the said opening in the base, the latch structure having a latch portion extending through the said opening in the cover to latch the cover in the closed position, when the plug-in unit is mounted on a section of bus duct with the cover in the closed position a lower portion of the latch structure being engageable with the housing of the section of bus duct to prevent unlatching movement of the latch structure to thereby prevent opening of the cover, when the plug-in unit is not mounted on a section of bus duct the latch structure being movable out of latching position to permit opening of the cover, and during said movement of the latch structure out of latching position the said lower portion of the latch structure moving out of the plug-in unit housing through said opening in the base of the plug-in unit housing.

2. A bus duct plug-in unit comprising, in combination, a housing having an opening in the base thereof, an openable cover on the housing and having an opening therein, a latch structure rotatably supported intermediate its ends and having a latch portion extending through the opening in the cover to latch the cover in the close position, an engaging portion at the other end of the latch structure in proximity to the opening in the base, means biasing the latch structure to the latching position, the latch structure being movable to the unlatching position to permit opening of the cover during which movement the engaging portion of the latch structure passes out through the opening in the base, a cam surface on the latch portion of the latch structure, and when the cover is moved to the closed position a portion of the cover engaging the cam surface of the latch structure to move the latch strucure in unlatching direction to permit closing of the cover.

3. In an electrical power distribution system, a bus duct plug-in unit comprising an enclosure comprising a base, sidewalls, and an openable cover disposed opposite said base, circuit interrupting means supported within said enclosure on said base, a section of bus duct comprising a bus duct housing and a plurality of bus bars supported within said bus duct housing, means for mounting said plug-in unit on said bus duct housing with said base adjacent said bus duct housing, means electrically connecting said circuit interrupting means to said bus bars when said plug-in unit is mounted on said bus duct housing, said plug-in unit comprising interlocking means latching said cover in the closed position, means operable when said plug-in unit is not mounted on said bus duct housing to defeat said interlocking means to permit opening of said cover, and means operating automatically to prevent defeat of said interlocking means when said plug-in unit is mounted on said bus duct housing with said cover in the closed position.

4. In a bus duct system of electrical power distribution, a section of bus duct comprising a housing and a plurality of bus bars supported within the housing, a plug-in unit comprising a housing having an opening in the base thereof, an openable cover on said plug-in unit housing and having an opening therein, a latch structure rotatably supported within said plug-in unit housing and having a latch portion at one end thereof extending out through said opening in said cover to latch said cover in the closed position, circuit interrupting means mounted within said plug-in unit housing, means for mounting said plug-in unit on said bus duct, means electrically connecting said circuit interrupting means to said bus bars when said plug-in unit is mounted on said bus duct, an engaging portion at the other end of said latch structure in proximity to said opening in said base, when said plug-in unit is mounted on said bus duct with said cover in the closed position and an attempt is made to move said latch structure to its unlatching position said engaging portion moving in said opening in said plug-in unit base and engaging said bus duct housing to prevent unlatching movement of said latch structure to thereby prevent opening of said cover.

5. A bus duct plug-in unit comprising an enclosure including a base having an opening therein, sidewalls extending from said base, an openable cover disposed opposite said base, a circuit interrupting unit supported within said enclosure on said base, means extending through said opening and constructed to engage one or more bus bars when said plug-in unit is mounted on a section of bus duct to electrically connect said circuit interrupting unit with bus bars disposed within said section of bus duct, interlocking means latching said cover in a closed position, means for moving said interlocking means out of latching position to permit opening of said cover, means for mounting said plug-in unit on a section of bus duct, and means operating automatically to prevent unlatching movement of said interlocking means when said plug-in unit is mounted on said section of bus duct with said cover in the closed position.

6. A bus duct plug-in unit comprising an enclosure including a base having an opening therein, sidewalls extending from said base, an openable cover having an opening therein and being disposed opposite said base, a circuit interrupting unit supported within said enclosure on said base, means extending through said opening in said base and constructed to engage one or more bus bars when said plug-in unit is mounted on the housing of a section of bus duct, interlocking means latching said cover in a closed position, said interlocking means comprising a rotatable latch structure having a latch portion extending through said opening in said cover to latch said cover in the closed position, said latch structure being manually movable out of latching position to permit opening of said cover, means for mounting said plug-in unit on a section of bus duct with said base adjacent the housing of said bus duct, and said plug-in unit being constructed such that when said plug-in unit is mounted on said section of bus duct said latch structure will engage said housing to prevent unlatching movement of said latch structure to thereby prevent opening of said cover.

7. A bus duct plug-in unit comprising an enclosure including a base having a first opening therein, an openable cover disposed opposite said base, a circuit interrupting unit supported within said enclosure on said base, means extending through said first opening and constructed to engage one or more bus bars when said plug-in unit is mounted on a section of bus duct, said base having a second opening therein, interlocking means comprising a rotatable latch latching said cover in a closed position, means for moving said latch out of latching position to permit opening of said cover during which unlatching movement a part of said latch moves through said second opening, means for mounting said plug-in unit on a section of bus duct whereupon said latch part will engage said bus duct to prevent unlatching movement of said latch to thereby prevent opening of said cover if said cover is closed when said plug-in unit is mounted on said bus duct and to prevent closing of said cover if said cover is open when said plug-in unit is mounted on said bus duct.

References Cited in the file of this patent

UNITED STATES PATENTS

| | | |
|---|---|---|
| 1,443,867 | Burns | Jan. 30, 1923 |
| 1,863,224 | Kauffman et al. | June 14, 1932 |
| 1,983,902 | Hanny | Dec. 11, 1934 |
| 2,079,286 | Hammerly | May 4, 1937 |
| 2,161,571 | Harvey | June 6, 1939 |
| 2,173,062 | Hammerly | Sept. 12, 1939 |
| 2,861,139 | Platz et al. | Nov. 18, 1958 |
| 2,902,555 | Herrmann | Sept. 1, 1959 |